(12) United States Patent
Chandroliya et al.

(10) Patent No.: US 11,809,426 B2
(45) Date of Patent: Nov. 7, 2023

(54) SYSTEM FOR IMPLEMENTING A DATA DRIVEN CHANNEL FOR QUERY EXECUTIONS USING QUANTUM COMPUTING

(71) Applicant: BANK OF AMERICA CORPORATION, Charlotte, NC (US)

(72) Inventors: Vimal Chandroliya, Gujarat (IN); Anirudh Kumar Sharma, Haryana (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 150 days.

(21) Appl. No.: 17/591,666

(22) Filed: Feb. 3, 2022

(65) Prior Publication Data

US 2023/0244663 A1    Aug. 3, 2023

(51) Int. Cl.
  *G06F 16/2453* (2019.01)
  *G06N 10/80* (2022.01)
  *G06F 16/22* (2019.01)

(52) U.S. Cl.
  CPC .... *G06F 16/24542* (2019.01); *G06F 16/2255* (2019.01); *G06N 10/80* (2022.01)

(58) Field of Classification Search
  CPC .. G06N 10/80; G06N 10/00; G06F 16/24542; G06F 16/2255
  See application file for complete search history.

(56) References Cited

U.S. PATENT DOCUMENTS

| | | |
|---|---|---|
| 9,129,224 B2 | 9/2015 | Lanting et al. |
| 9,207,672 B2 | 12/2015 | Williams et al. |
| 9,361,169 B2 | 6/2016 | Berkley |
| 9,424,526 B2 | 8/2016 | Ranjbar |
| 9,438,246 B1 | 9/2016 | Naaman |
| 10,044,638 B2 * | 8/2018 | Dadashikelayeh ..... G06F 16/25 |
| 10,339,466 B1 | 7/2019 | Ding et al. |
| 10,599,988 B2 | 3/2020 | Thom et al. |

(Continued)

FOREIGN PATENT DOCUMENTS

KR    20220038374 A  *  3/2022   ......... G06F 18/2323

OTHER PUBLICATIONS

21. LaRose, "introduction to the Query model of Quantum Computing", pp. 39-44, 2022. (Year: 2022).*

*Primary Examiner* — Matthew J Ellis
(74) *Attorney, Agent, or Firm* — Moore & Van Allen PLLC; Anup Shrinivasan Iyer (57) ABSTRACT

Systems, computer program products, and methods are described herein for implementing a data driven channel for query executions using quantum computing. The present invention is configured to receive, from a user input device, a query; parse, using a query processing engine, the query; determine a classical execution plan based on at least parsing the query; convert, using a query optimization engine, the classical execution plan into a quantum execution plan; initiate a query execution engine on the quantum execution plan; determine, using the query execution engine, a quantum circuit design for execution of the quantum execution plan; execute, using the query execution engine, the quantum execution plan; generate a query result based on at least executing the quantum execution plan; and transmit control signals configured to cause the user input device to display the query result.

18 Claims, 5 Drawing Sheets

(56) References Cited

U.S. PATENT DOCUMENTS

| | | |
|---|---|---|
| 10,963,809 B2 * | 3/2021 | Gambetta .............. G06N 10/00 |
| 11,010,683 B2 | 5/2021 | Amin et al. |
| 11,138,511 B2 | 10/2021 | Yarkoni et al. |
| 11,366,808 B2 * | 6/2022 | Zhou .................... G06F 16/217 |
| 11,386,346 B2 | 7/2022 | Xue et al. |
| 11,734,254 B2 * | 8/2023 | Jayaram .............. G06F 16/2255 |
| | | 707/698 |
| 2004/0167753 A1 | 8/2004 | Downs et al. |
| 2008/0313430 A1 | 12/2008 | Bunyk |
| 2009/0077001 A1 * | 3/2009 | Macready ................ G06N 5/02 |
| | | 706/57 |
| 2011/0060710 A1 | 3/2011 | Amin |
| 2013/0144925 A1 | 6/2013 | Macready et al. |
| 2013/0218833 A1 * | 8/2013 | North ...................... G06F 16/27 |
| | | 707/610 |
| 2014/0025606 A1 | 1/2014 | Macready |
| 2015/0154255 A1 * | 6/2015 | Cole ................. G06F 16/24542 |
| | | 707/718 |
| 2019/0317978 A1 | 10/2019 | Amin et al. |
| 2020/0320424 A1 | 10/2020 | Yarkoni et al. |
| 2020/0356889 A1 | 11/2020 | Amin et al. |
| 2021/0272010 A1 | 9/2021 | Williams |
| 2021/0289020 A1 | 9/2021 | Rolfe et al. |
| 2023/0130738 A1 * | 4/2023 | Sengupta ............ G06F 16/2453 |
| | | 707/718 |
| 2023/0141190 A1 * | 5/2023 | Ma .................... G06F 16/24557 |
| | | 707/714 |

* cited by examiner

SYSTEM FOR IMPLEMENTING A DATA DRIVEN CHANNEL FOR QUERY EXECUTIONS USING QUANTUM COMPUTING

FIELD OF THE INVENTION

The present invention embraces a system for implementing a data driven channel for query executions using quantum computing.

BACKGROUND

One of the biggest concerns for entities when dealing with and managing databases is its data and size complexity. Managing a complex and large database can become a tedious task especially when the type of data being managed or handled is expected to grow massively either anticipated or in an unpredictable manner. While most databases are often indexed for fast data retrieval and manipulation, it is not uncommon for SQL queries to run into situations that require a full database scan, that can result in processing overload in classical computing systems. Quantum computing presents a reliable solution for processing queries in large databases. Therefore, there is a need for system for implementing a data driven channel for query executions quantum computing.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for implementing a data driven channel for query executions using quantum computing is presented. The system comprising: at least one non-transitory storage device; and at least one processor coupled to the at least one non-transitory storage device, wherein the at least one processor is configured to: receive, from a user input device, a query; parse, using a query processing engine, the query; determine a classical execution plan based on at least parsing the query; convert, using a query optimization engine, the classical execution plan into a quantum execution plan; initiate a query execution engine on the quantum execution plan; determine, using the query execution engine, a quantum circuit design for execution of the quantum execution plan; execute, using the query execution engine, the quantum execution plan; generate a query result based on at least executing the quantum execution plan; and transmit control signals configured to cause the user input device to display the query result.

In some embodiments, the at least one processor is further configured to: determine, using the query processing engine, one or more attributes associated with the query; determine, using the query processing engine, one or more databases associated with the query; and determine the classical execution plan based on at least the one or more attributes and the one or more databases.

In some embodiments, the classical execution plan comprises at least a sequence of steps used to process data stored in the one or more databases using the one or more attributes.

In some embodiments, the at least one processor is further configured to: determine that a first portion of the one or more databases are non-indexed; and generate, using the query processing engine, one or more temporary indexes for the first portion of the one or more databases.

In some embodiments, executing the quantum execution plan further comprises: initiating, a pattern identification engine, on one or more datasets from the one or more databases associated with the quantum execution plan; and identifying, using the pattern identification engine, one or more hash-based data patterns associated with each of the one or more datasets.

In some embodiments, the hash-based data pattern is identified using a checksum function.

In some embodiments, determining the quantum circuit design further comprises: selecting one or more quantum circuits with a depth value>1 for processing the one or more datasets identified as having the one or more hash-based data patterns; selecting one or more quantum circuits with a depth value=1 for processing the one or more datasets identified as having no hash-based data patterns; and determining the quantum circuit design as a combination of the one or more quantum circuits with depth value>1 and the one or more quantum circuits for depth value=1.

In one aspect, a computer program product for implementing a data driven channel for query executions using quantum computing is presented. The computer program product comprising a non-transitory computer-readable medium comprising code causing a first apparatus to: receive, from a user input device, a query; parse, using a query processing engine, the query; determine a classical execution plan based on at least parsing the query; convert, using a query optimization engine, the classical execution plan into a quantum execution plan; initiate a query execution engine on the quantum execution plan; determine, using the query execution engine, a quantum circuit design for execution of the quantum execution plan; execute, using the query execution engine, the quantum execution plan; generate a query result based on at least executing the quantum execution plan; and transmit control signals configured to cause the user input device to display the query result.

In yet another aspect, a method for implementing a data driven channel for query executions using quantum computing is presented. The method comprising: receiving, from a user input device, a query; parsing, using a query processing engine, the query; determining a classical execution plan based on at least parsing the query; converting, using a query optimization engine, the classical execution plan into a quantum execution plan; initiating a query execution engine on the quantum execution plan; determining, using the query execution engine, a quantum circuit design for execution of the quantum execution plan; executing, using the query execution engine, the quantum execution plan; generating a query result based on at least executing the quantum execution plan; and transmitting control signals configured to cause the user input device to display the query result.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer or a prospective customer. In other embodiments, a user may be a system performing one or more tasks described herein.

As used herein, a "user interface" may be any device or software that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, and/or one or more devices, nodes, clusters, or systems within the system environment described herein. For example, an interaction may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, a "quantum computer" is any computer that utilizes the principles of quantum physics to perform computational operations. Several variations of quantum computer design are known, including photonic quantum computing, superconducting quantum computing, nuclear magnetic resonance quantum computing, and/or ion-trap quantum computing. Regardless of the particular type of quantum computer implementation, all quantum computers encode data onto qubits. Whereas classical computers encode bits into ones and zeros, quantum computers encode data by placing a qubit into one of two identifiable quantum states. Unlike conventional bits, however, qubits exhibit quantum behavior, allowing the quantum computer to process a vast number of calculations simultaneously. A qubit can be formed by any two-state quantum mechanical system. For example, in some embodiments, a qubit may be the polarization of a single photon or the spin of an electron. Qubits are subject to quantum phenomena that cause them to behave much differently than classical bits. Quantum phenomena include superposition, entanglement, tunneling, superconductivity, and the like.

Two quantum phenomena are especially important to the behavior of qubits in a quantum computer: superposition and entanglement. Superposition refers to the ability of a quantum particle to be in multiple states at the same time. Entanglement refers to the correlation between two quantum particles that forces the particles to behave in the same way even if they are separated by great distances. Together, these two principles allow a quantum computer to process a vast number of calculations simultaneously. In a quantum computer with n qubits, the quantum computer can be in a superposition of up to 2n states simultaneously. By comparison, a classical computer can only be in one of the 2n states at a single time. As such, a quantum computer can perform vastly more calculations in a given time period than its classical counterpart. For example, a quantum computer with two qubits can store the information of four classical bits. This is because the two qubits will be a superposition of all four possible combinations of two classical bits (00, 01, 10, or 11). Similarly, a three qubit system can store the information of eight classical bits, four qubits can store the information of sixteen classical bits, and so on. A quantum computer with three hundred qubits could possess the processing power equivalent to the number of atoms in the known universe.

Despite the seemingly limitless possibilities of quantum computers, present quantum computers are not yet substitutes for general purpose computers. However, quantum computers can outperform classical computers in specific computational problems, such as database queries (search problems. Database querying involves the use of a domain-specific language such as Structured Query Language (SQL) for handling structured data in database management systems. One of the biggest concerns for entities when dealing with and managing databases is its data and size complexity. Managing a complex and large database can become a tedious task especially when the type of data being managed or handled is expected to grow massively either anticipated or in an unpredictable manner. While most databases are often indexed for fast data retrieval and manipulation, it is not uncommon for SQL queries to run into situations that require a full database scan, that can result in processing overload in classical computing systems. Quantum computing presents a reliable solution for processing queries in large databases. Therefore, there is a need for system for implementing a data driven channel for query executions quantum computing.

Accordingly, the present invention, (i) receives, from a user input device, an SQL query, (ii) parses, i.e., separating the pieces of a SQL statement into a data structure capable of being processed, using a query processing engine, the query. Identifies the various attributes and various databases involved in the execution of the query by parsing the query, (iii) determines whether the databases identified from the query are indexed. Indexing allows a database to be queried more efficiently by creating pointers to where the data is stored within the database. For any database that is non-indexed, generate, using the query processing engine, temporary indexes, (iv) determines a classical execution plan based on at least parsing the query. A classical execution plan may describe the steps and the order of operations associated with executing the query using a classical computing system, i.e., system 130 (See FIG. 1), (v) converts, using a query optimization engine, the classical execution plan into a quantum execution plan. If the query is to be executed using a quantum computing system, i.e., quantum computing system 150 (See FIG. 1), whose circuit behavior is based on quantum mechanics, the classical execution plan must be represented in the form of a quantum execution plan, (vi) initiates a query execution engine on the quantum execution plan, (vii) determines, using the query execution engine, a quantum circuit design for execution of the quantum execution plan. A quantum circuit may be a computational routine consisting of coherent quantum operations on quantum data, such as qubits, and concurrent real-time classical computation. Initiates, a pattern identification engine, on datasets from the databases associated with the quantum execution plan to identify pre-existing patterns in the datasets. Selects quantum circuits with a depth value>1 for processing the datasets identified as having the hash-based data patterns. Selects quantum circuits with a depth value=1 for processing the datasets identified as having no hash-based data patterns, (viii) executes, using the query execution engine, the quantum execution plan, (ix) generates a query result based on at least executing the quantum execution plan, and (x) displays the query result on the user input device.

Figure 1:
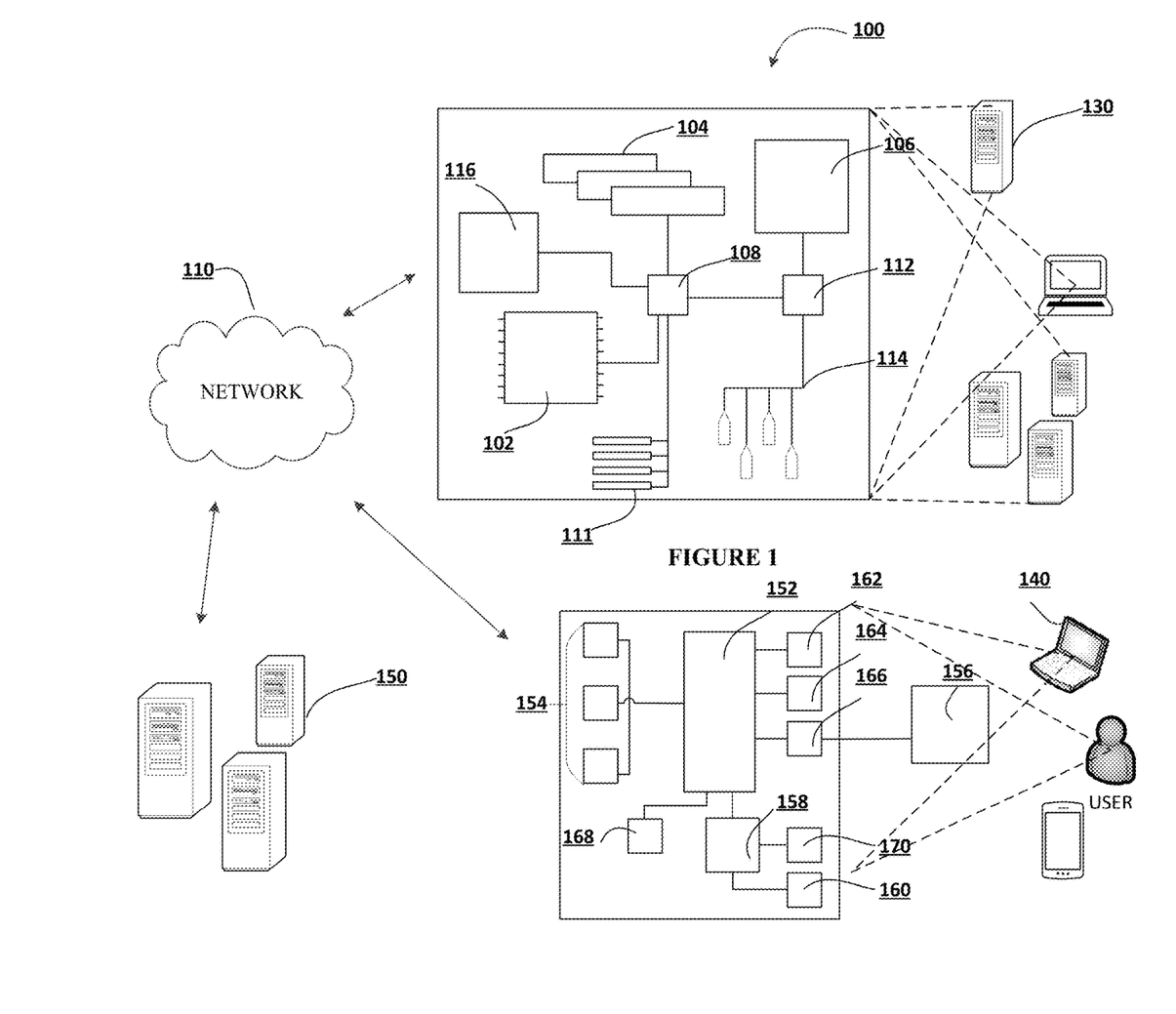
FIG. 1 illustrates technical components of a system for implementing a data driven channel for query executions using quantum computing, in accordance with an embodiment of the invention.

FIG. 1 illustrates technical components of a system for implementing a data driven channel for query executions using quantum computing 100, in accordance with an embodiment of the invention. FIG. 1 provides a unique system that includes specialized servers and system communicably linked across a distributive network of nodes required to perform the functions of the process flows described herein in accordance with embodiments of the present invention.

As illustrated, the system environment 100 includes a network 110, a system 130, a quantum computing system 150, and a user input device 140. In some embodiments, the system 130, the quantum computing system 150, and the user input device 140 may be used to implement the processes described herein, in accordance with an embodiment of the present invention. In this regard, the system 130, the quantum computing system 150, and/or the user input device 140 may include one or more applications stored thereon that are configured to interact with one another to implement any one or more portions of the various user interfaces and/or process flow described herein.

In accordance with embodiments of the invention, the system 130 is intended to represent various forms of digital computers, such as laptops, desktops, video recorders, audio/video player, radio, workstations, servers, wearable devices, Internet-of-things devices, electronic kiosk devices (e.g., automated teller machine devices), blade servers, mainframes, or any combination of the aforementioned. In accordance with embodiments of the invention, the user input device 140 is intended to represent various forms of mobile devices, such as personal digital assistants, cellular telephones, smartphones, augmented reality (AR) devices, virtual reality (VR) devices, extended reality (XR) devices, and other similar computing devices. The components shown here, their connections and relationships, and their functions, are meant to be exemplary only, and are not meant to limit implementations of the inventions described and/or claimed in this document.

In accordance with some embodiments, the system 130 may include a processor 102, memory 104, a storage device 106, a high-speed interface 108 connecting to memory 104, and a low-speed interface 112 connecting to low speed bus 114 and storage device 106. Each of the components 102, 104, 106, 108, 111, and 112 are interconnected using various buses, and may be mounted on a common motherboard or in other manners as appropriate. The processor 102 can process instructions for execution within the system 130, including instructions stored in the memory 104 or on the storage device 106 as part of an application that may perform the functions disclosed herein, display graphical information for a GUI on an external input/output device, such as display 116 coupled to a high-speed interface 108, and/or the like. In other implementations, multiple processors and/or multiple buses may be used, as appropriate, along with multiple memories and types of memory. Also, multiple systems, same or similar to system 130 may be connected, with each system providing portions of the necessary operations (e.g., as a server bank, a group of blade servers, or a multi-processor system). In some embodiments, the system 130 may be a server managed by the business. The system 130 may be located at the facility associated with the business or remotely from the facility associated with the business.

The memory 104 stores information within the system 130. In one implementation, the memory 104 is a volatile memory unit or units, such as volatile random access memory (RAM) having a cache area for the temporary storage of information. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

In some embodiments, the system 130 may be configured to access, via the network 110, a number of other computing devices (not shown) in addition to the user input device 140 and the quantum computing system 150. In this regard, the system 130 may be configured to access one or more storage devices and/or one or more memory devices associated with each of the other computing devices. In this way, the system 130 may implement dynamic allocation and de-allocation of local memory resources among multiple computing devices in a parallel or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, it appears as though the memory is being allocated from a central pool of memory, even though the space is distributed throughout the system. This method of dynamically allocating memory provides increased flexibility when the data size changes and allows memory reuse for better utilization of the memory resources when the data sizes are large.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms, as shown in FIG. 1. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1 also illustrates a quantum computing system 150, in accordance with an embodiment of the invention. While the system 130 is configured to perform classical digital processing tasks described herein, the quantum computing system 150 is configured to perform quantum processing tasks. In some embodiments, the quantum computing system 150 includes a quantum computing infrastructure including, a quantum memory and a quantum processing unit to execute the processes described herein. The quantum computing infrastructure includes physical components for housing the quantum processor and the quantum memory. The quantum computer infrastructure further includes a cryogenic refrigeration system to keep the quantum computing subsystem at the desired operating levels. In general, the quantum processor is designed to perform quantum computing tasks, such as, the adiabatic quantum computation and/or quantum annealing to for data optimization. The quantum memory is comprised of a plurality of qubits used for storing data during operation of the quantum computing system 150. In general, qubits are any two-state quantum mechanical system. It will be understood that the quantum memory may be comprised of any such two-state quantum mechanical system, such as the polarization of a single photon, the spin of an electron, and the like.

FIG. 1 also illustrates a user input device 140, in accordance with an embodiment of the invention. The user input device 140 includes a processor 152, memory 154, an input/output device such as a display 156, a communication interface 158, and a transceiver 160, among other components. The user input device 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the user input device 140, including instructions stored in the memory 154, which in one embodiment includes the instructions of an application that may perform the functions disclosed herein. The processor may be implemented as a chipset of chips that include separate and multiple analog and digital processors. The processor may be configured to provide, for example, for coordination of the other components of the user input device 140, such as control of user interfaces, applications run by user input device 140, and wireless communication by user input device 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of user input device 140 with other devices. External interface 168 may provide, for example, for wired communication in some implementations, or for wireless communication in other implementations, and multiple interfaces may also be used.

The memory 154 stores information within the user input device 140. The memory 154 can be implemented as one or more of a computer-readable medium or media, a volatile memory unit or units, or a non-volatile memory unit or units. Expansion memory may also be provided and connected to user input device 140 through an expansion interface (not shown), which may include, for example, a SIMM (Single In Line Memory Module) card interface. Such expansion memory may provide extra storage space for user input device 140 or may also store applications or other information therein. In some embodiments, expansion memory may include instructions to carry out or supplement the processes described above and may include secure information also. For example, expansion memory may be provided as a security module for user input device 140 and may be programmed with instructions that permit secure use of user input device 140. In addition, secure applications may be provided via the SIMM cards, along with additional information, such as placing identifying information on the SIMM card in a non-hackable manner. In some embodiments, the user may use the applications to execute processes described with respect to the process flows described herein. Specifically, the application executes the process flows described herein.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the user input device 140 to transmit and/or receive information or commands to and from the system 130 via the network 110. Any communication between the system 130, the quantum computing system 150, and the user input device 140 (or any other computing devices) may be subject to an authentication protocol allowing the system 130 to maintain security by permitting only authenticated users (or processes) to access the protected resources of the system 130, which may include servers, databases, applications, and/or any of the components described herein. To this end, the system 130 may require the user (or process) to provide authentication credentials to determine whether the user (or process) is eligible to access the protected resources. Once the authentication credentials are validated and the user (or process) is authenticated, the system 130 may provide the user (or process) with permissioned access to the protected resources. Similarly, the user input device 140, the quantum computing system 150 (or any other computing devices) may provide the system 130 with permissioned to access the protected resources of the user input device 140, the quantum computing system 150 (or any other computing devices), which may include a GPS device, an image capturing component (e.g., camera), a microphone, a speaker, and/or any of the components described herein.

The user input device 140 may communicate with the system 130, the quantum computing system 150 (and one or more other devices) wirelessly through communication interface 158, which may include digital signal processing circuitry where necessary. Communication interface 158 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 160. In addition, short-range communication may occur, such as using a Bluetooth, Wi-Fi, or other such transceiver (not shown). In addition, GPS (Global Positioning System) receiver module 170 may provide additional navigation— and location-related wireless data to user input device 140, which may be used as appropriate by applications running thereon, and in some embodiments, one or more applications operating on the system 130.

The user input device 140 may also communicate audibly using audio codec 162, which may receive spoken information from a user and convert it to usable digital information. Audio codec 162 may likewise generate audible sound for a user, such as through a speaker, e.g., in a handset of user input device 140. Such sound may include sound from voice telephone calls, may include recorded sound (e.g., voice messages, music files, etc.) and may also include sound generated by one or more applications operating on the user input device 140, and in some embodiments, one or more applications operating on the system 130.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a technical environment that includes a back end component (e.g., as a data server), that includes a middleware component (e.g., an application server), that includes a front end component (e.g., a client computer having a graphical user interface or a Web browser through which a user can interact with an implementation of the systems and techniques described here), or any combination of such back end, middleware, or front end components.

As shown in FIG. 1, the components of the system 130, the quantum computing system 150, and the user input device 140 are interconnected using the network 110. The network 110, which may be include one or more separate networks, be a form of digital communication network such as a telecommunication network, a local area network ("LAN"), a wide area network ("WAN"), a global area network ("GAN"), the Internet, or any combination of the foregoing. It will also be understood that the network 110 may be secure and/or unsecure and may also include wireless and/or wired and/or optical interconnection technology.

In accordance with an embodiments of the invention, the components of the system environment 100, such as the system 130, the quantum computing system 150, and the user input device 140 may have a client-server relationship, where the user input device 130 makes a service request to the system 130, the system 130 accepts the service request, processes the service request, and returns the requested information to the user input device 140, and vice versa. This relationship of client and server typically arises by virtue of computer programs running on the respective computers and having a client-server relationship to each other.

It will be understood that the embodiment of the system environment 100 illustrated in FIG. 1 is exemplary and that other embodiments may vary. As another example, in some embodiments, the system environment may include more, fewer, or different components. As another example, in some embodiments, some or all of the portions of the system environment 100 may be combined into a single portion. Likewise, in some embodiments, some, or all of the portions of the system 130 may be separated into two or more distinct portions.

Figure 2:
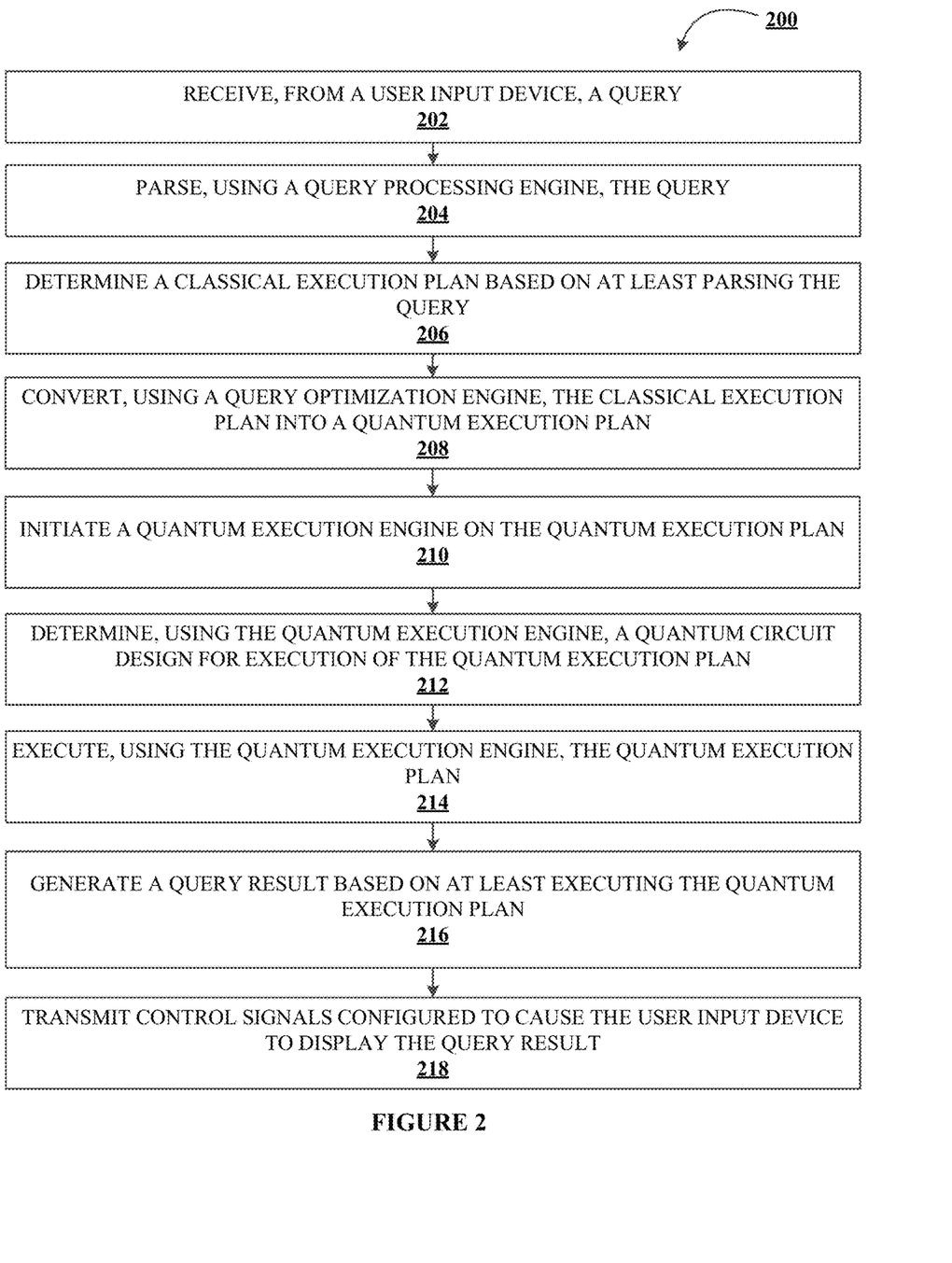
FIG. 2 illustrates a process flow for implementing a data driven channel for query executions using quantum computing, in accordance with an embodiment of the invention.

FIG. 2 illustrates a process flow for implementing a data driven channel for query executions using quantum computing 200, in accordance with an embodiment of the invention. As shown in block 202, the process flow includes receiving, from a user input device, a query. In some embodiments, the query may be in a domain-specific language, such as SQL, designed for managing data held in database management systems, such as relational database management systems (RDBMS). SQL may be used to submit requests, i.e., queries, for data or information from a database table or combination of tables. These queries may not only be used to retrieve data from a database, but also to manipulate databases. For example, queries may be used to insert records, update records, delete records, create new databases, create new tables in a database, create stored procedures in a database, create views in a database, set permissions on tables, datasets, procedures, and views, and/or the like.

Next, as shown in block 204, the process flow includes parsing, using a query processing engine, the query. In some embodiments, a query (in SQL) may be comprised of various attributes, i.e., functions, expressions, and/or the like. Therefore, it is possible that there are multiple ways to execute a query. To find the most optimal way to run a query, i.e., using the least amount of resources in the shortest possible time, the query must be parsed. Part of the parsing process involves identifying the various attributes and various databases involved in the execution of the query. In other words, parsing the query may involve separating the pieces of a SQL statement into a data structure capable of being processed.

In some embodiments, the system may be configured to determine whether the databases identified from the query are indexed. Indexing allows a database to be queried more efficiently by creating pointers to where the data is stored within the database. This is particularly useful in larger databases. When a query is executed on a large database that is non-indexed, the execution process will be forced to begin with the first row and then read through the entire table to find the relevant data for processing the query. On the other hand, if the large database has an index for the columns in question, the execution process can quickly determine the position to seek to in the middle of the data file without having to look at all the data. This process is typically much faster than reading every row sequentially. Therefore, for any database that is non-indexed, the system may be configured to generate, using the query processing engine, temporary indexes.

Next, as shown in block 206, the process flow includes determining a classical execution plan based on at least parsing the query. In some embodiments, a classical execution plan may describe the steps and the order of operations associated with executing the query using a classical computing system, i.e., system 130. Using the attributes and databases identified by the query execution engine during the parsing process, the system may be configured to generate the classical execution plan to process data stored in the databases using the attributes identified in the query.

Next, as shown in block 208, the process flow includes converting, using a query optimization engine, the classical execution plan into a quantum execution plan. In classical computing systems, e.g., system 130, a bit is a single unit of information that has a value of either 0 or 1 (off or on, false or true, low or high). On the other hand, in quantum computing systems, e.g., quantum computing system 150, a qubit or quantum bit is the basic unit of quantum information—the quantum version of the classical binary bit physically realized with a two-state device. Therefore, qubit can be in states labelled |0} and |1}, but it can also be in a superposition of these states, a|0}+b|1}, where a and b are complex numbers. While classical computing systems process information by manipulating bits with the help of logic gates (AND, OR, NOT, or the like), quantum computing systems process information by manipulating qubits with the help of quantum logic gates. Therefore, a classical execution plan is capable of being executed by a classical computing system whose circuit behavior is based on classical physics. However, if the query is to be executed using a quantum computing system, whose circuit behavior is based on quantum mechanics, the classical execution plan must be represented in the form of a quantum execution plan. Accordingly, the system may be configured to use the query optimization engine to convert the bits in the classical execution plan into qubits, thereby generating a quantum execution plan.

Next, as shown in block 210, the process flow includes initiating a query execution engine on the quantum execution plan. Having represented the classical execution plan in the form of a quantum execution plan capable of being processed by a query execution engine, the system may be configured to begin execution of the quantum execution plan using the quantum computing system 150.

Next, as shown in block 212, the process flow includes determining, using the query execution engine, a quantum circuit design for execution of the quantum execution plan. In some embodiments, a quantum circuit may be a computational routine consisting of coherent quantum operations on quantum data, such as qubits, and concurrent real-time classical computation. In other words, a quantum circuit may be an ordered sequence of quantum gates, measurements, and resets, all of which may be conditioned on and use data from the real-time classical computation. A quantum circuit design may include a plurality of quantum circuits (selected based on the data being processed) of varying depths. A quantum circuit may be envisioned as a product of individual layers, L1, L2, . . . , Ld. The depth of a quantum circuit is the number of layers, d. In other words, the circuit depth is the length of the longest path from the input (or from a preparation) to the output (or a measurement gate), moving forward in time along qubit wires. Depending on the data patterns in the dataset used during processing, the depth of the quantum circuit chosen may vary. Quantum execution plans that include databases with datasets that have no recognizable pattern are processed using quantum circuits with a depth equal to 1, while databases with datasets that have recognizable patterns are processed using quantum circuits with depths greater than 1.

To identify patterns in the data, the system may be configured to initiate, a pattern identification engine, on one or more datasets from the one or more databases associated with the quantum execution plan. Here, the databases associated with the quantum execution plan are the same databases that are associated with the classical execution plan. By initiating the pattern identification engine, the system may be configured to identify one or more hash-based data patterns associated with each of the one or more datasets. In some embodiments, the hash-based data pattern is identified using a checksum function (or equivalent pattern recognition algorithm) implemented across the datasets. Once the hash-based data patterns are identified, the system may be configured to design the quantum circuit. In this regard, the system may be configured to select one or more quantum circuits with a depth value>1 for processing the one or more datasets identified as having the one or more hash-based data patterns. Next, the system may be configured to select one or more quantum circuits with a depth value=1 for processing the one or more datasets identified as having no hash-based data patterns. In response, the system may be configured to determine the quantum circuit design as a combination of the one or more quantum circuits with depth value>1 and the one or more quantum circuits for depth value=1.

Next, as shown in block 214, the process flow includes executing, using the query execution engine, the quantum execution plan. In this regard, the system may be configured to execute the quantum execution plan using the quantum circuit design specifically configured for the quantum execution plan. Next, as shown in block 216, the process flow includes generating a query result based on at least executing the quantum execution plan. Next, as shown in block 218, the process flow includes transmitting control signals configured to cause the user input device to display the query result.

Figure 3:
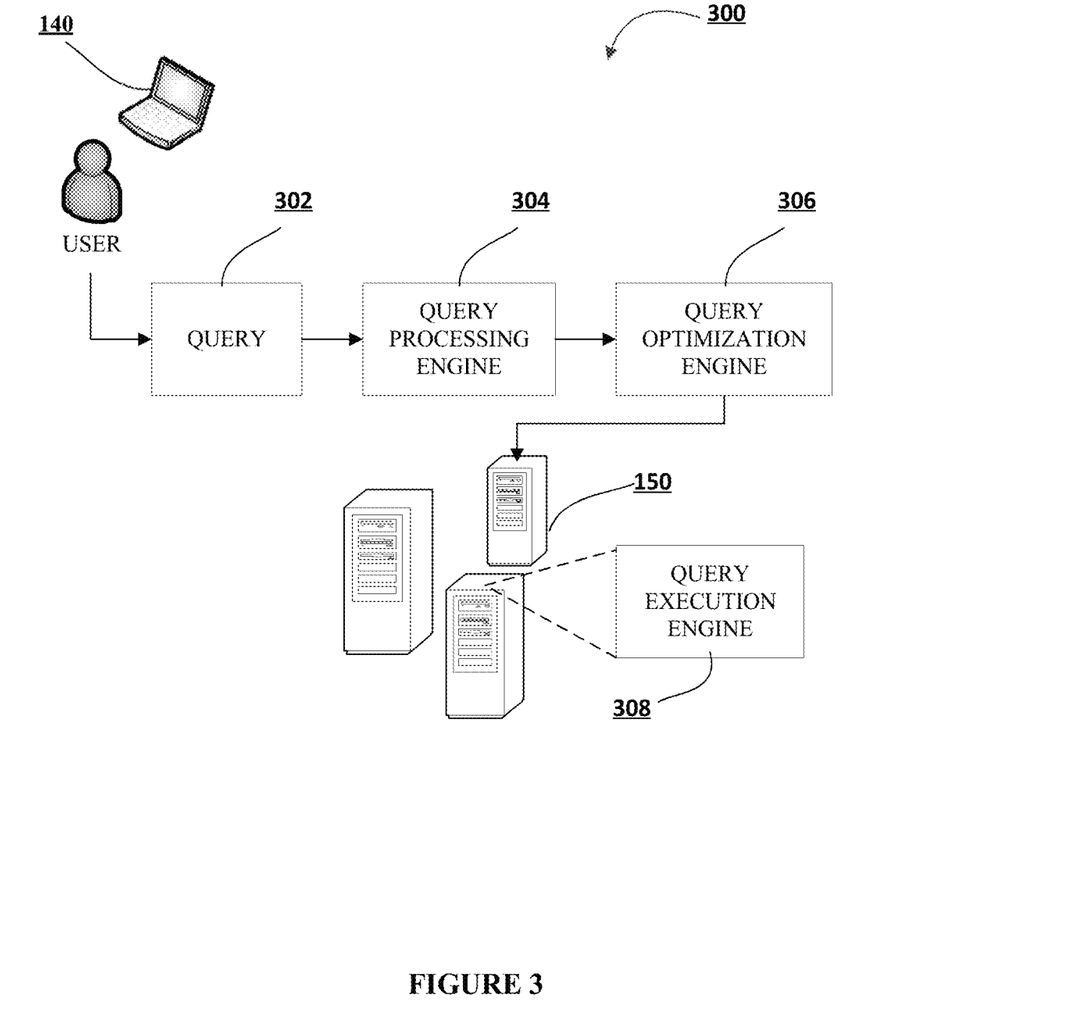
FIG. 3 illustrates a data flow diagram for a data driven channel for query executions using quantum computing, in accordance with an embodiment of the invention.

FIG. 3 illustrates a data flow diagram for a data driven channel for query executions using quantum computing 300, in accordance with an embodiment of the invention. As shown in FIG. 3, the user may submit a query 302 for processing using a user input device 140. This query is processed using a query processing engine 304 where it is parsed to identify attributes, databases, index information, and/or the like. Once processed, the query processing engine 304 may generate a classical execution plan for the query. This classical execution plan is then processed by the query optimization engine 306, which converts the classical execution into a quantum execution plan capable of being executed by a quantum computing system 150. In some embodiments, the quantum computing system 150 may further include a query processing engine 308 that is configured to design the quantum circuit to execute the quantum execution plan and process the query to generate a query result.

Figure 4:
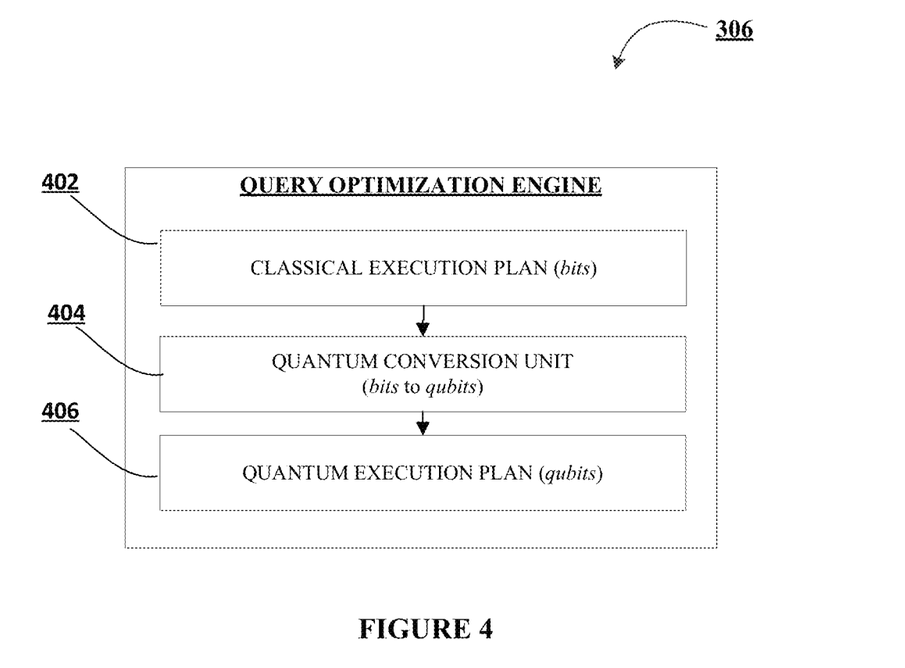
FIG. 4 illustrates a query optimization engine, in accordance with an embodiment of the invention.

FIG. 4 illustrates a query optimization engine 306, in accordance with an embodiment of the invention. As shown, the query optimization engine 306 may be used to convert a classical execution plan 402 into a quantum execution plan 406 using a quantum conversion unit 404.

Figure 5:
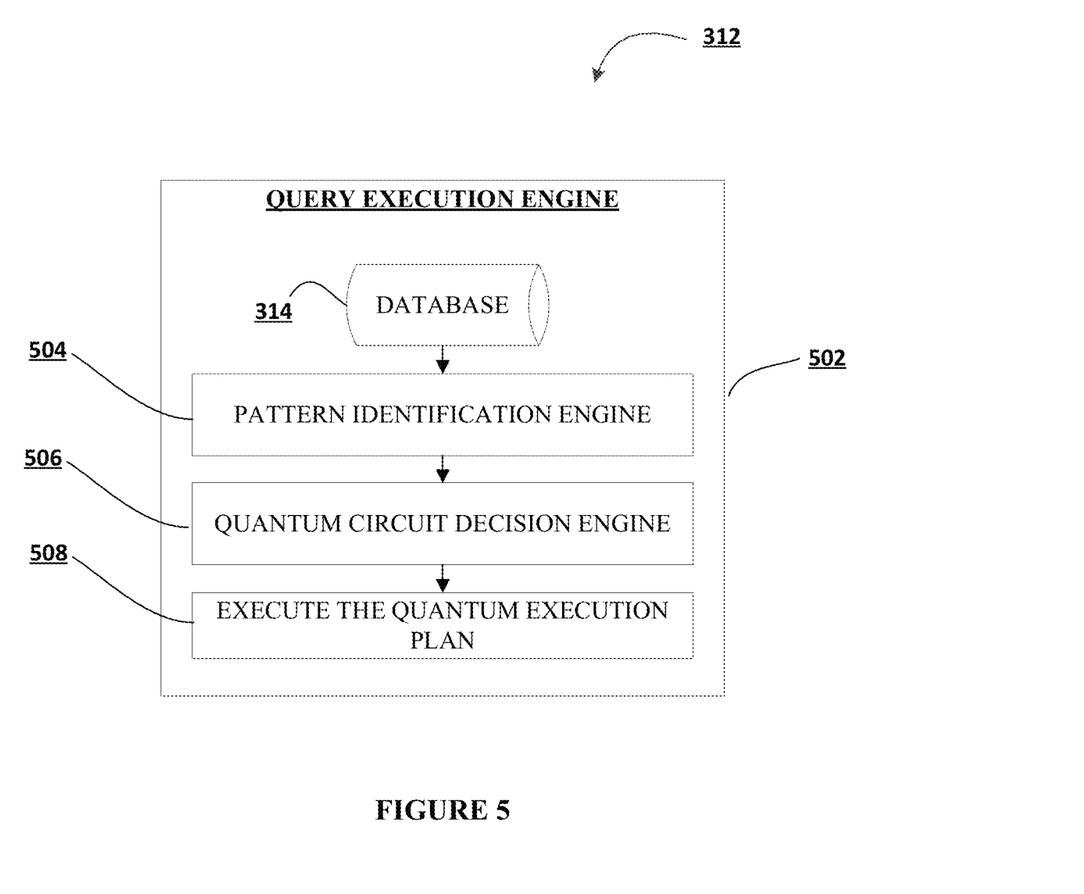
FIG. 5 illustrates a query execution engine, in accordance with an embodiment of the invention.

FIG. 5 illustrates a query execution engine 312, in accordance with an embodiment of the invention. As shown, the query execution engine 312 may further include a pattern identification engine 502 that is configured to identify any underlying patterns in the datasets retrieved from the database 314, a quantum circuit design engine 506 that is configured to select and configure the quantum circuit. This quantum circuit is then used to execute the quantum execution plan 508 to generate the query result.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for implementing a data driven channel for query executions using quantum computing, the system comprising:
    at least one non-transitory storage device; and
    at least one processor coupled to the at least one non-transitory storage device, wherein the at least one processor is configured to:
        receive, from a user input device, a query;
        parse, using a query processing engine, the query;
        determine a classical execution plan based on at least parsing the query;
        convert, using a query optimization engine, the classical execution plan into a quantum execution plan;
        initiate a query execution engine on the quantum execution plan;
        determine, using the query execution engine, a quantum circuit design for execution of the quantum execution plan, wherein determining the quantum circuit design further comprises:
            selecting one or more quantum circuits with a depth value >1 for processing one or more datasets with one or more hash-based data patterns;
            selecting one or more quantum circuits with a depth value=1 for processing one or more datasets without the one or more hash-based data patterns; and
            determining the quantum circuit design as a combination of the one or more quantum circuits with depth value >1 and the one or more quantum circuits for depth value=1;
        execute, using the quantum circuit design, the quantum execution plan;
        generate a query result based on at least executing the quantum execution plan; and
        transmit control signals configured to cause the user input device to display the query result.

2. The system of claim 1, wherein the at least one processor is further configured to:
    determine, using the query processing engine, one or more attributes associated with the query;
    determine, using the query processing engine, one or more databases associated with the query; and
    determine the classical execution plan based on at least the one or more attributes and the one or more databases.

3. The system of claim 2, wherein the classical execution plan comprises at least a sequence of steps used to process data stored in the one or more databases using the one or more attributes.

4. The system of claim 2, wherein the at least one processor is further configured to:
    determine that a first portion of the one or more databases are non-indexed; and
    generate, using the query processing engine, one or more temporary indexes for the first portion of the one or more databases.

5. The system of claim 2, wherein executing the quantum execution plan further comprises:
    initiating, a pattern identification engine, on the one or more datasets from the one or more databases associated with the quantum execution plan; and
    identifying, using the pattern identification engine, the one or more hash-based data patterns associated with each of the one or more datasets.

6. The system of claim 5, wherein the hash-based data pattern is identified using a checksum function.

7. A computer program product for implementing a data driven channel for query executions using quantum computing, the computer program product comprising a non-transitory computer-readable medium comprising code causing a first apparatus to:
    receive, from a user input device, a query;
    parse, using a query processing engine, the query;
    determine a classical execution plan based on at least parsing the query;
    convert, using a query optimization engine, the classical execution plan into a quantum execution plan;
    initiate a query execution engine on the quantum execution plan;
    determine, using the query execution engine, a quantum circuit design for execution of the quantum execution plan, wherein determining the quantum circuit design further comprises:
        selecting one or more quantum circuits with a depth value >1 for processing one or more datasets with one or more hash-based data patterns;
        selecting one or more quantum circuits with a depth value=1 for processing one or more datasets without the one or more hash-based data patterns; and
        determining the quantum circuit design as a combination of the one or more quantum circuits with depth value >1 and the one or more quantum circuits for depth value=1;
    execute, using the quantum circuit design, the quantum execution plan;
    generate a query result based on at least executing the quantum execution plan; and
    transmit control signals configured to cause the user input device to display the query result.

8. The computer program product of claim 7, wherein the first apparatus is further configured to:

determine, using the query processing engine, one or more attributes associated with the query;

determine, using the query processing engine, one or more databases associated with the query; and determine the classical execution plan based on at least the one or more attributes and the one or more databases.

9. The computer program product of claim 8, wherein the classical execution plan comprises at least a sequence of steps used to process data stored in the one or more databases using the one or more attributes.

10. The computer program product of claim 8, wherein the first apparatus is further configured to:

determine that a first portion of the one or more databases are non-indexed; and generate, using the query processing engine, one or more temporary indexes for the first portion of the one or more databases.

11. The computer program product of claim 8, wherein executing the quantum execution plan further comprises:

initiating, a pattern identification engine, on the one or more datasets from the one or more databases associated with the quantum execution plan; and identifying, using the pattern identification engine, the one or more hash-based data patterns associated with each of the one or more datasets.

12. The computer program product of claim 11, wherein the hash-based data pattern is identified using a checksum function.

13. A method for implementing a data driven channel for query executions using quantum computing, the method comprising:

receiving, from a user input device, a query;

parsing, using a query processing engine, the query;

determining a classical execution plan based on at least parsing the query;

converting, using a query optimization engine, the classical execution plan into a quantum execution plan;

initiating a query execution engine on the quantum execution plan;

determining, using the query execution engine, a quantum circuit design for execution of the quantum execution plan, wherein determining the quantum circuit design further comprises:

selecting one or more quantum circuits with a depth value >1 for processing one or more datasets with one or more hash-based data patterns;

selecting one or more quantum circuits with a depth value=1 for processing one or more datasets without the one or more hash-based data patterns; and determining the quantum circuit design as a combination of the one or more quantum circuits with depth value >1 and the one or more quantum circuits for depth value=1;

executing, using the quantum circuit design, the quantum execution plan;

generating a query result based on at least executing the quantum execution plan; and transmitting control signals configured to cause the user input device to display the query result.

14. The method of claim 13, wherein the method further comprises:

determining, using the query processing engine, one or more attributes associated with the query;

determining, using the query processing engine, one or more databases associated with the query; and determining the classical execution plan based on at least the one or more attributes and the one or more databases.

15. The method of claim 14, wherein the classical execution plan comprises at least a sequence of steps used to process data stored in the one or more databases using the one or more attributes.

16. The method of claim 14, wherein the method further comprises:

determining that a first portion of the one or more databases are non-indexed; and generating, using the query processing engine, one or more temporary indexes for the first portion of the one or more databases.

17. The method of claim 14, wherein executing the quantum execution plan further comprises:

initiating, a pattern identification engine, on one or more datasets from the one or more databases associated with the quantum execution plan; and identifying, using the pattern identification engine, one or more hash-based data patterns associated with each of the one or more datasets.

18. The method of claim 17, wherein the hash-based data pattern is identified using a checksum function.

* * * * *